United States Patent [19]

Aihara et al.

[11] Patent Number: 4,498,033
[45] Date of Patent: Feb. 5, 1985

[54] AUTOMATIC DOOR ACTUATOR

[75] Inventors: Hiroshi Aihara, Suita; Akira Matumura, Ibaraki; Hiroshi Takemura, Neyagawa; Rikiya Kobashi, Amagasaki; Keisuke Satomi; Hiroe Ishibashi, both of Kobe, all of Japan

[73] Assignee: Hokuyo Automatic Co., Ltd., Osaka, Japan

[21] Appl. No.: 405,702

[22] Filed: Aug. 5, 1982

[30] Foreign Application Priority Data

Aug. 11, 1981 [JP] Japan ................................ 56-126222

[51] Int. Cl.³ ......................................... H02P 1/04
[52] U.S. Cl. .................................... 318/261; 318/265; 318/266; 318/466; 318/468; 187/29 R
[58] Field of Search ............... 318/265, 266, 445, 463, 318/466, 468, 261, 98, 99, 102, 103, 120, 127, 142, 385, 391, 400, 443, 444, 445, 446, 447, 671, 282, 286, 468, 739, 470, 603, 626, 256, 264, 285, 467

[56] References Cited

U.S. PATENT DOCUMENTS

| | | | |
|---|---|---|---|
| 4,234,833 | 11/1980 | Barrett | 318/468 X |
| 4,299,308 | 11/1981 | Shung et al. | 318/266 X |
| 4,300,660 | 11/1981 | Schoemmann et al. | 318/266 X |
| 4,305,480 | 12/1981 | Hmelovsky | 318/266 X |
| 4,338,553 | 7/1982 | Scott, Jr. | 318/466 X |
| 4,365,250 | 12/1982 | Matsuoka et al. | 318/266 X |
| 4,383,206 | 5/1983 | Matsuoka et al. | 318/466 X |
| 4,393,342 | 7/1983 | Matsuoka et al. | 318/266 X |
| 4,401,929 | 8/1983 | Odaka et al. | 318/266 X |

Primary Examiner—J. V. Truhe
Assistant Examiner—Paul Shik Luen Ip
Attorney, Agent, or Firm—Armstrong, Nikaido, Marmelstein & Kubovcik

[57] ABSTRACT

Disclosed is an automatic door actuator which comprises arithmetic unit for calculating a weight of a door, a distance of movement of the door and braking points of the door through learn control of door actuation which is effected once every time a power supply switch is turned on and irrespective of the on-off condition of a normal door actuation start switch; first memory for storing results of calculation by the arithmetic unit; second memory for previously storing various phase angles for starting operation, for deceleration braking operation and for predetermined low velocity control, corresponding to various weights of the door; whereby the control unit is responsive to the first memory to read out from the second memory the phase angles for starting operation, for deceleration braking operation and for predetermined low velocity control corresponding to the actual weight of the door determined in the learn control to thereby supply a trigger signal to semiconductor controlled rectifying elements in accordance with the read-out phase angles corresponding to the actual door weight and the distance of movement of the door and the braking points of the door determined in the learn control.

6 Claims, 8 Drawing Figures

AUTOMATIC DOOR ACTUATOR

The present invention relates to an automatic door actuator, and more particularly to an automatic door actuator which automatically learns a sequence of door opening/closing operations upon power-on to measure and store a weight of the door, a distance of movement and a braking position so that in subsequent operations the door can be automatically controlled to open and close with A.C. power suitable to the weight of the door.

Conventionally, a door actuator has been proposed which uses a start switch such as a mat switch to automatically open the door when a person stands in front of the door and automatically close the door after a predetermined time period, as disclosed, for example, in Japanese Utility Model Publication No. 38361/1979 and Japanese patent application Laid-Open No. 19366/1980.

In order to install such a conventional automatic door actuator, the following work and adjustment are required.

A full-close switch and a full-open switch are disposed at a start point and an end point, respectively; of a path of movement of the door and braking position switches are disposed at braking points determined depending on the distance of movement. A weight of the door is set to a control box by a door weight setting switch to appropriately set start force. The braking torque of a condenser motor is set so as to be adapted to the weight of the door by adjusting a deceleration braking power control potentiometer and a predetermined low velocity is set by adjusting a low velocity control potentiometer. Those adjustments are troublesome because correlation between the deceleration braking force and the braking start position must be adjusted to the weight of the particular door. When a resistance of movement of the door changes during the use of the automatic door actuator, the predetermined low velocity and the predetermined low torque must be readjusted. This readjustment also requires experience and special skill and hence it is troublesome.

It is an object of the present invention to overcome the above difficulties encountered in the prior art.

In accordance with an aspect of the present invention, there is provided an automatic door actuator which is energized by an external power supply in response to turning-on of a power switch and which comprises a door, motor means coupled to the door to open and close the door, semiconductor controlled rectifying means for selectively connecting the motor means to the external power supply at a controlled phase angle to control a rotary velocity of the motor means, and control means operable, when activated in response to turning-on of a start switch, to supply a trigger signal at a controlled phase angle to the semiconductor controlled rectifying means to activate the semiconductor controlled rectifying means, wherein the actuator further comprises arithmetic means for calculating a weight of the door, a distance of movement of the door and braking points of the door through learn control of door actuation which is effected once every time the power switch is turned on and irrespective of the on-off condition of the start switch, first memory means for storing results of calculation by the arithmetic means; second memory means for previously storing various phase angles for starting operation, for deceleration braking operation and for predetermined low velocity control, corresponding to various weights of the door, whereby the control means is responsive to the first memory means to read out from the second memory means the phase angles for starting phase angle, for deceleration braking operation and for predetermined low velocity control, corresponding to the actual weight of the door determined in the learn control to thereby supply the trigger signal to the semiconductor controlled rectifying means in accordance with the read-out phase angles corresponding to the actual door weight and the distance of movement of the door and the braking points of the door determined in the learn control.

The present invention will become apparent from the following description of a preferred embodiment of the present invention taken in conjunction with the accompanying drawings, in which.

Before the preferred embodiments of the present invention are explained, the prior art automatic door actuator is first explained in order to facilitate the understanding of the present invention.

Figure 1A:
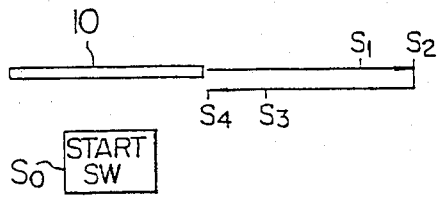
FIG. 1A shows a schematic diagram of a prior art automatic door.
Figure 1B:
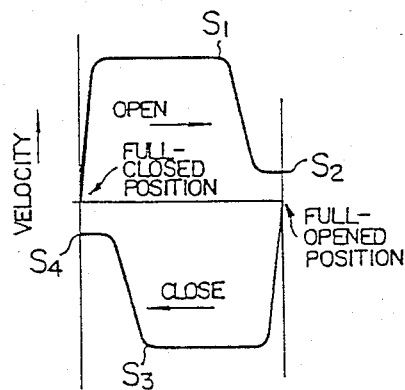
FIG. 1B shows a chart for explaining the operation thereof.

Referring to FIG. 1A, the prior art automatic door actuator has a start switch $S_0$, a switch $S_2$ actuated at a full-opened position of a door 10, switches $S_1$ and $S_3$ actuated at braking positions of the door 10 and a switch $S_4$ actuated at a full-closed position of the door 10. These switches are arranged by the door 10 which is horizontally movable. The door 10 is opened and closed in accordance with a process shown in FIG. 1B. When the start switch $S_0$ such as a mat switch is turned on, the door 10 is opened in a direction shown by an arrow. When the switch $S_1$ is actuated during the movement of the door, braking force is applied to the door so that the door is decelerated from a rated velocity (e.g. 45 cm/sec) to a predetermined low velocity (e.g. 5 cm/sec). When the switch $S_2$ is actuated at the full-opened position to which the door is urged at the predetermined low velocity, the door stops. After a predetermined time period, the door starts to move in the opposite direction or closing direction provided that the start switch $S_0$ has been turned off. When the switch $S_3$ is actuated, braking force is applied so that the door is decelerated to the predetermined low velocity. The door closes at the predetermined low velocity and when it reaches the full-closed position, the switch $S_4$ is actuated so that the door stops and restores to the original closed condition.

Figure 2:
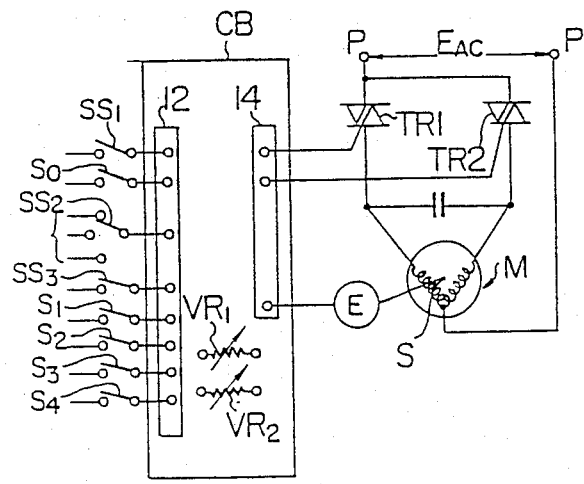
FIG. 2 shows a circuit diagram of a control circuit for the automatic door shown in FIG. 1A.

FIG. 2 shows a control circuit for the prior art automatic door actuator. A door actuating motor M such as a condenser motor is connected to external power supply terminals P, P through bidirectional triode thyristors $TR_1$ and $TR_2$ such as TRIAC for forwardly and backwardly rotating the motor M respectively. An encoder E which generates pulses in proportion to a rotational speed of the motor M is coupled to a door actuating drive rotary element such as a rotary shaft S of the motor M. In a control box CB, there are provided a potentiometer $VR_1$ for setting the deceleration braking force, a potentiometer $VR_2$ for setting the predetermined low velocity, an input interface 12 for the external switches and an input/output interface 14 for controlling the motor.

The input interface 12 is coupled to the switches $S_0$, $S_1$, $S_2$, $S_3$ and $S_4$, a switch $SS_3$ which sets the direction of opening of the door, and a switch $SS_2$ which sets the weight of the door. The input/output interface 14 produces signals to the respective trigger terminals of the bidirectional triode thyristors $TR_1$ and $TR_2$ and receives an output from the encoder E.

The door opening/closing operation by the control circuit shown in FIG. 2 is now explained in detail with reference to a supplied power versus velocity characteristic chart shown in FIG. 3.

Figure 3:
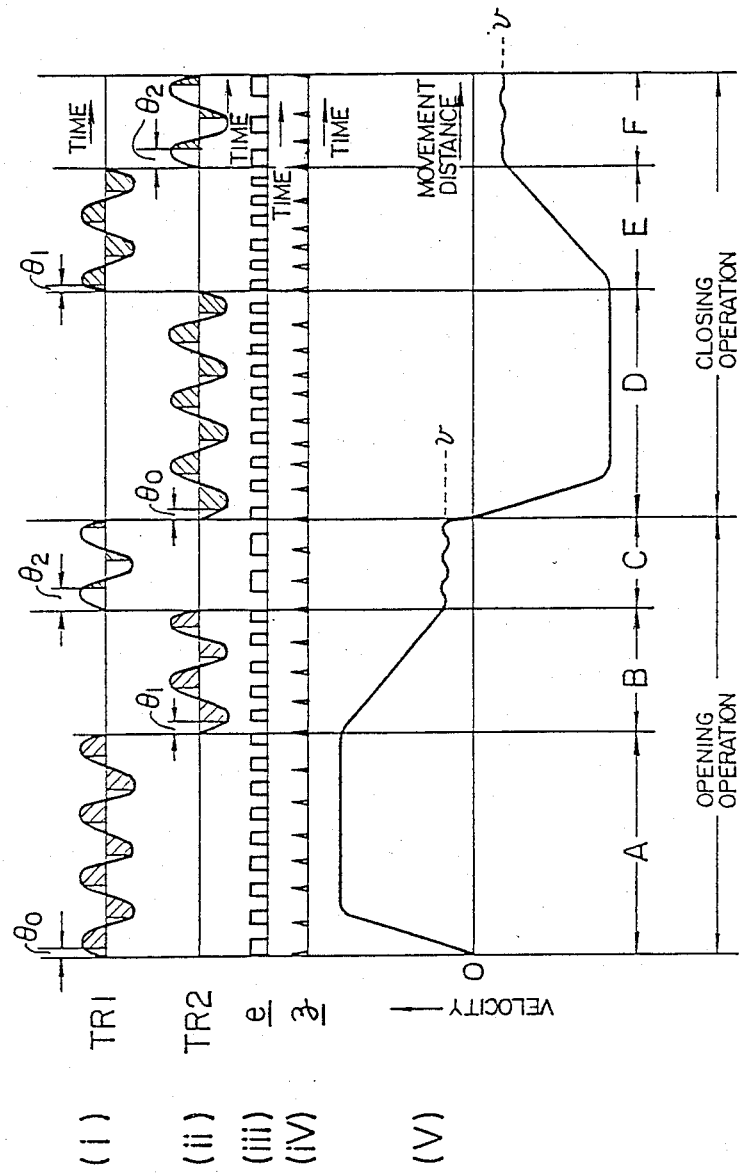
FIG. 3 shows a diagram of a supplied power versus velocity characteristic of the prior art automatic door actuator controlled by the control circuit shown in FIG. 2.

In FIG. 3, a curve (V) shows a velocity versus distance characteristic of the movement of the door 10 when the door 10 is opened from the full-closed position to the full-opened position and then closed from the full-opened position to the full-closed position with an abscissa representing the distance of movement, while the respective abscissas represent time in the charts (i) to (iv). The charts (i) and (ii) show voltage waveform characteristics of the thrysistors $TR_1$ and $TR_2$ for various sections in the distance of movement shown in the chart (V), that is, a section A from the full-closed position to a deceleration start point, a deceleration section B, a section C in which the door is opened to the full-opened position at the predetermined low velocity ($v$), a section D from the full-opened position to the deceleration start point, a deceleration section E and a section F in which the door is closed to the full-closed position at the predetermined low velocity ($v$). The chart (iii) shows a waveform of the pulse e of the encoder E, and the chart (iv) shows a waveform of a zero-crossing pulse z of an A.C. power supply voltage.

The control circuit shown in FIG. 2 senses the distance of displacement of the door 10 by the pulse e generated by the encoder E in proportion to the rotational speed of the door actuation drive rotary element S and controls the power to be supplied to the motor M by a firing phase angle timed in accordance with the pulse z generated at the timing of the zero-crossing of the externally supplied A.C. voltage $E_{AC}$. When the start switch $S_0$ is turned on, the forward thyristor $TR_1$ is fired at a predetermined firing phase angle so that the door 10 is moved in the opening direction. The starting torque is determined by the firing phase angle $\theta_0$ which is set by the door weight setting switch $SS_2$. The door is accelerated until it reaches a normal constant velocity. When the door 10 reaches the braking point and the switch $S_1$ is actuated, the forward thyristor $TR_1$ is turned off and the backward thyristor $TR_2$ is fired at a firing phase angle $\theta_1$ preset by the potentiometer $VR_1$ to effect the reverse-phase braking. The velocity of the door 10 in the opening direction is decreased and when it reaches the predetermined low velocity preset by the potentiometer $VR_2$, the backward thyristor $TR_2$ is turned off. The rate of the output pulses e of the encoder E is compared with the value of the predetermined low velocity $v$ preset by the potentiometer $VR_2$ and the forward thyristor $TR_1$ is feedback-controlled by a phase angle $\theta_2$ to move the door 10 at the predetermined low velocity to urge the door 10 to the end point until the switch $S_2$ is actuated. Both the forward and backward thyristors $TR_1$ and $TR_2$ are kept non-conductive for a predetermined time period until time-up to keep the door 10 fully open. Upon the time-up, the backward thyristor $TR_2$ is fired at the firing phase angle $\theta_0$ preset by the switch $SS_2$ to move the door in the closing direction. When the door 10 reaches the braking point and the switch $S_3$ is actuated, the backward thyristor $TR_2$ is turned off and the forward thyristor $TR_1$ is fired at the firing phase angle $\theta_1$ preset by the potentiometer $VR_1$ to effect the reverse-phase braking. As the velocity of the door 10 in the closing direction is decreased and reaches the predetermined low velocity ($v$) preset by the potentiometer $VR_2$ the forward thyristor $TR_1$ is turned off and the backward thyristor $TR_2$ is fired at the phase angle $\theta_2$ to effect the feedback control so that the door 10 is moved at the predetermined low velocity ($v$) to urge the door 10 to the start point until the switch $S_4$ is actuated. When the switch $S_4$ is actuated, both the forward and backward thyristors $TR_1$ and $TR_2$ are turned off and the door 10 is stopped at the full-closed point.

The prior art automatic door actuator described above has the disadvantages as discussed before. The present invention overcomes the above difficulties.

Figure 4:
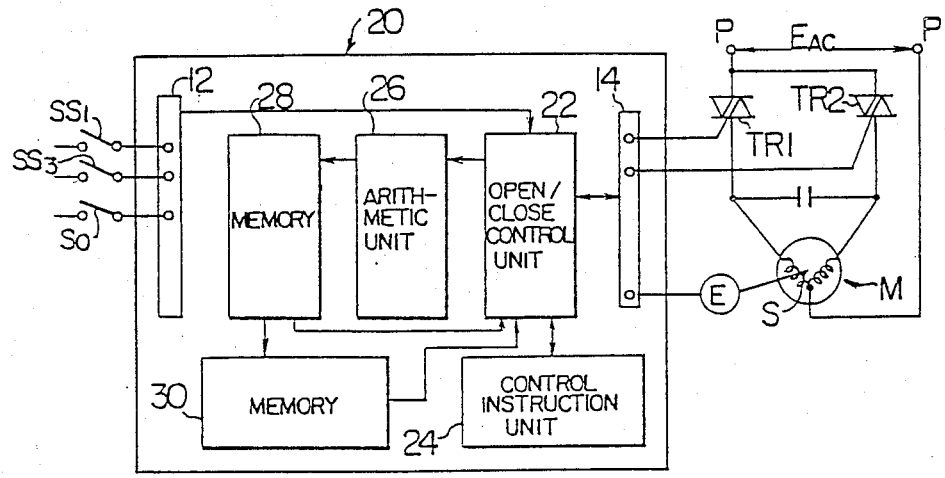
FIG. 4 shows a block diagram of an embodiment of a control circuit in accordance with the present invention.

FIG. 4 shows an embodiment of the present invention in which the like numerals to those shown in FIG. 2 denote the like elements. A control unit 20 comprises an opening/closing control unit 22 for controlling a phase angle of a trigger signal supplied to the thyristors $TR_1$ and $TR_2$ to control the actuation of the door, a control instruction unit 24 which contains data for learn control of one cycle of door actuation (a learn control program) and data for controlling normal door actuation (normal control program), an arithmetic unit 26 for calculating a weight of the door, a distance of movement of the door and a braking point through one cycle of learn control, a memory 28 for storing the weight of the door, the distance of movement of the door and the braking point calculated by the arithmetic unit 26, and a reference value memory 30 which stores a starting phase angle for the calculated weight of the door, a deceleration braking phase angle and a low velocity control phase angle. The input interface 12 for the external switches and the input/output interface 14 for controlling the motor are incorporated in the control unit 20.

The components of control unit 20 will be described below.

The arithmetic unit 26 is a main part of the control unit 20 and provides for determining the weight of a door, a distance of movement of a door and a braking point. These values are determined during the learn control operation. The door weight, distance of movement and a braking point are stored in the memory 28. Then, after the learn control operation, the door is set to the normal door actuation operation in which the determined value, the door weight, moving stroke and braking point are utilized for automatic door control. (The door weight is converted to the corresponding start phase angle $\theta_0$, braking phase angle $\theta_1$ and low velocity control phase angle $\theta_2$ in the memory 30.) A conventional microcomputer can be used for this element. The arithmetic unit corresponds to a CPU in the microcomputer.

The open/close control unit 22 operates in response to values determined by the unit 26. In response thereto the open/close unit 22 selects a thyristor to be triggered and then outputs optimum phase angles $\theta_0$, $\theta_1$, and $\theta_2$, each corresponding to the weight of the door during the normal door actuation control. In response to the outputs of the open/close control unit 22, input/output interface 14 supplies a trigger signal to the selected thryristor with the trigger phase angle outputted from the open/close control unit 22.

Then control instruction unit 24 instructs the open/close control unit 22 to control the normal door actuation operation in accordance with the data determined by the arithmetic unit 26. The control sequence of the normal door actuation operation is stored in the memory 28. The sequence program represented by the curve shown in FIG. 3 is carried out by the instruction of the control instruction unit 24.

The normal door actuation control (FIG. 3) is described above by way of example of the prior art. In the present invention, the characteristic curve of the normal door actuation control is substantially similar to the prior art as shown in FIG. 3. However, in the present invention, the optimum trigger phase angles $\theta_0$, $\theta_1$, and $\theta_2$, the moving distance of the door and the braking point can be determined by the learn control program before the normal door actuation operation. This is a point of departure of the present invention from the prior art.

Interface 12 and 14 are generally used in the control unit 20 to convert external signals to adapt for computer control and vice-versa. The present invention's interfaces 12 and 14 are substantially similar with the prior art's interfaces 12 and 14.

The input interface 12 receives control signals delivered from the external switches, $S_0$, $SS_1$, and $SS_3$. $S_0$ is a door open switch. $SS_1$ is a power switch for starting the learn control sequence. $SS_3$ is a direction selection switch. The above control signal of the switches applies to the open/close control unit 22.

The input/output interface 14 receives the output signal of the encoder E and then applies the signal pulses to the arthmetic unit 26 via the open/close control unit 22 to determine the moving distance of the door and door speed. The input/output interface 14 also receives the output signal of the open/close control unit 22 and then applies the trigger signal to the thyristors.

The memory units 28 and 30 are conventional memory in use today. Memory 28 stores the door weight, distance of movement, braking point and the control sequence for normal door actuation. Memory 30 stores reference values such as a starting phase angle for the calculated weight of a door, a deceleration braking phase angle and a low velocity control phase angle.

In accordance with the embodiment of the present invention, there are provided only three switches, the start switch $S_0$, the power switch $SS_1$ and the direction selection switch $SS_3$ which are coupled to the input interface 12.

The input/output interface 14 provides signals to the trigger terminals of the thyristors $TR_1$ and $TR_2$ and receives the output of the encoder E.

The operation of the embodiment of FIG. 4 is now explained with reference to FIG. 5. In waveforms (i)–(v) of FIG. 5, the abscissas represent a position of the door 10 between the full-opened position and the full-closed position. A change in time corresponds to a change in position of the door.

When the power switch $SS_1$ is turned on, the learn control for one cycle of door actuation is started. The door may be set to the full-closed position when it is installed, but if a power fails during the actuation of the door, the door position is not defined. Accordingly, the door 10 is initially opened by several centimeters from the full-closed position at the predetermined low velocity and stopped there as shown in FIG. 5(i). After time-up, the door 10 is moved in the closing direction at the reference phase angle corresponding to the predetermined low velocity, as shown in FIG. 5(ii). If the door 10 is light, the velocity rises up faster (curve a) than a curve b for a standard weight door, and if the door 10 is heavy, the velocity rises up slowly (curve c). A gradient of the rise is measured by the arithmetic unit 26 of the control unit 20 based on the rate of the input pulses e from the encoder E by using reference clock pulses to determined the actual weight of the door. The value of the thus measured door weight is stored in the memory 28. Then, the door is moved to the full-close position and stopped there. Thus, the arithmetic unit 26 responds to the termination of the input pulse e from the encoder E to judge the stoppage of the door and stores the stop position in the memory 28. After a predetermined time period, the door 10 is opened through the feedback control at the predetermined low velocity as shown in FIG. 5(iii) and the arithmetic unit 26 counts up the pulses e generated by the encoder E (see FIG. 5(iv)) until the door reaches the full-opened position. The count which represents the distance of movement $L_1$ is stored in the memory 28. Upon time-up, the starting phase angle corresponding the weight of the door determined in the learn control is read out from the reference value memory 30 to the opening/closing control unit 22. Thus, the door which has been stopped at the full-opened position is now closed at a velocity determined by the starting phase angle as shown in FIG. 5(V). A braking distance $L_2$ between the braking point in the closing direction and the full-closed position is experimentarily determined in accordance with the weight of door and stored in the memory 30. A subtraction operation ($L_1-x$) is carried out by using the count of the pulses generated by the encoder E by subtracting the count corresponding to the distance x of movement of the door in the closing direction from the full-opened position from the count corresponding to the previously calculated distance of movement $L_1$ of the door. The value of distance x when the resulting difference ($L_1-x$) is equal to the braking distance $L_2$ is stored in the memory 28 as the braking point for the door opening operation. When the door 10 reaches the braking point in the closing direction, the braking phase angle $\theta_1$ corresponding to the weight of the door determined in the previous learn control is read out from the memory 30 and applied to the opening/closing control unit 22, which in turn generates the reverse-phase braking at the braking phase angle $\theta_1$ to decelerate the door. When the door velocity is decreased to the predetermined low velocity, the opening/closing control unit 22 continues to drive the door at the predetermined low velocity to the full-closed position by the low velocity control phase angle $\theta_2$ corresponding to the weight of the door, read out from the memory 30, and stops the door at the full-closed position. The arithmetic unit 26 stores the stop position or the full-closed position in the memory 28. After the learn control for one cycle of door actuation, the memory 28 now contains the weight of the door, the distance of movement of the door and the braking points and the memory 30 is now ready to provide the corresponding starting phase angle, the deceleration control phase angle and the predetermined low velocity control phase angle. The control instruction unit 24 then instructs to the opening/closing control unit 22 a normal door actuation control operation in accordance with the data derived through one cycle of learn control. Thereafter, each time when the start switch $S_0$ is turned on, the opening/closing control unit 22 controls the actuation of the door in accordance with the data derived in the learn control as shown in the supplied power versus velocity characteristic curve of FIG. 3.

The learn control in the above arrangement is carried out once every time the power switch $SS_1$ is newly turned on. Accordingly, any substantial change in weight of the door due to a change in moving resistance of the door during the use thereof is corrected each time.

Figure 5:
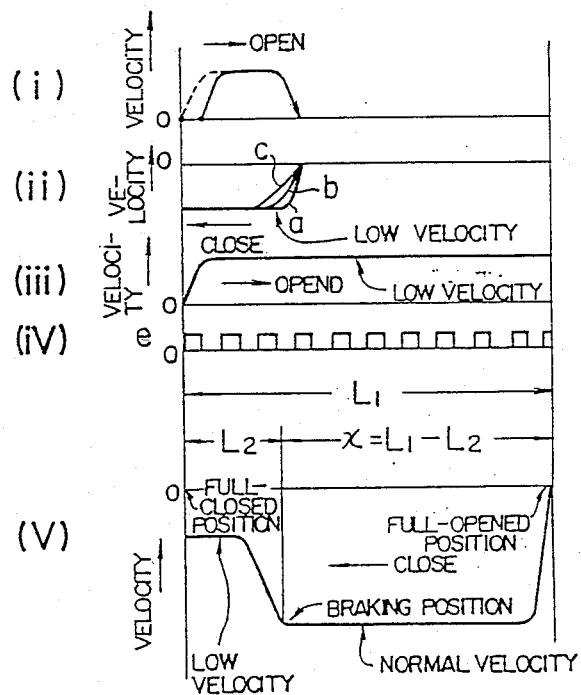
FIG. 5 shows a diagram for explaining learn control in accordance with the present invention.
Figure 6:
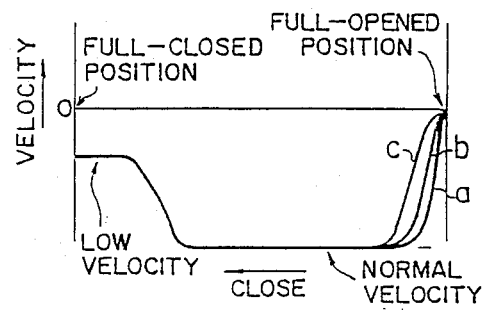
FIG. 6 shows a diagram for expalining additional learn control in accordance with the present invention effected in the beginning of each door closing operation instead of the case shown in FIG. 5(V)

FIG. 6 shows another embodiment of the invention. In this embodiment, the judgment of the door weight is further effected once every time the start switch $S_0$ is turned on in addition to the door weight judgment effected every time the power switch $SS_1$ is turned on. In the case where the automatic door actuator according to the present invention is utilized in a place at which the power source may largely fluctuates in voltage, for example more than ±20% of the normal value, when the learning control is effected only once in response to the turning-on of the power switch $SS_1$, it might be possible that the door stops before it reaches the end point or crashes into the end point, in the subsequent automatic door operation. In this case, it is preferable that the judgement of the door weight is effected once every time the start switch $S_0$ is turned on. FIG. 6 shows the door weight judgement effected with the predetermined low velocity at the beginning of each automatic door closing operation similarly to the door weight judgement effected every time the power switch $SS_1$ is turned on as illustrated in FIG. 5(ii).

Accordingly, the adjustment of the predetermined low velocity and the predetermined low torque which has been needed in the prior art when the automatic door is inspected for maintenance is not necessary.

The control unit 20 of the present invention may be constructed by an electronic circuit using IC chips, or more practically it may be constructed by a microcomputer such that the functions of the opening/closing control unit 22, the arithmetic unit 26, the memories 28 and 30 are implemented by programs in the microcomputer. In this case, the number of parts as well as a cost are reduced.

Figure 7:
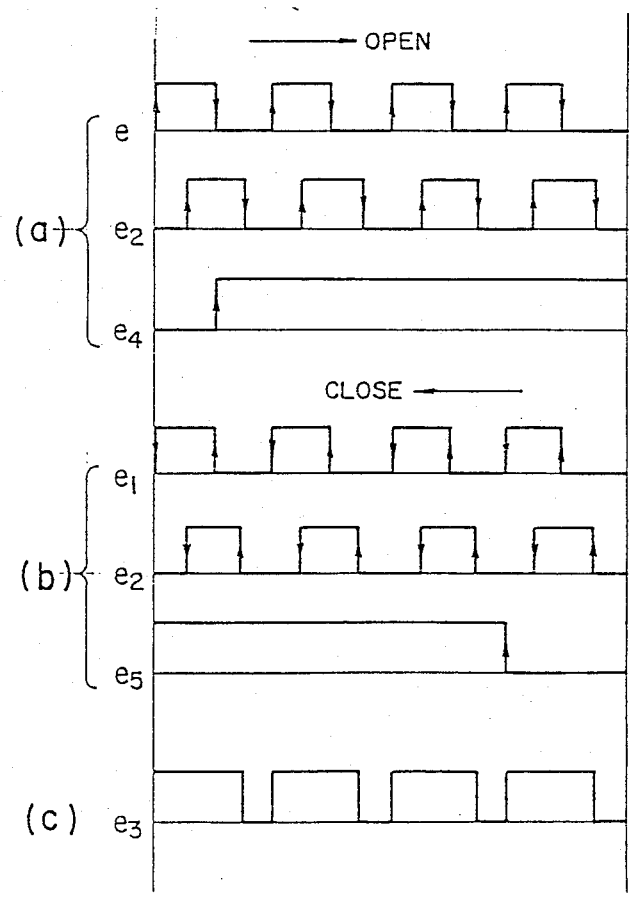
FIG. 7 shows a chart of pulses when two-phase encoder is employed.

Further, the encoder E may be preferably of the two-phase type, while in the embodiment mentioned above the output of the encoder E is shown in FIG. 5(iv) as if it has a single phase. FIG. 7 illustrates the case where two-phase encoder E is employed. The encoder E produces two output pulse trains $e_1$ and $e_2$ which are different in phase by $\frac{1}{4}\pi$ with each other. A train of pulses $e_3$ as shown in FIG. 7(c) is obtained by ORing the pulses $e_1$ and $e_2$ and utilized as the pulses for calculating the distance of displacement of the door instead of the pulse train e in FIG. 5(iv). As shown in FIG. 7(a), a waveform $e_4$ representing the door opening operation is generated in response to the condition that the first one pulse of the pulse train $e_1$ falls as the "high" state of the pulse train $e_2$. Similarly, as shown in FIG. 7(b) a waveform $e_5$ representing the door closing operation is generated in response to the condition that the first pulse of the pulse train $e_1$ falls at the "low" state of pulse train $e_2$. Each of the pulses $e_3$ is validated when it satisfies four conditions, during the door opening operation, that the pulse $e_1$ rises at the "low" state of the pulse $e_2$, the pulse $e_2$ rises at the "high" state of the pulse $e_1$, the pulse $e_1$ falls at the "high" state of the pulse $e_2$, and the pulse $e_2$ falls at the "low" state of the pulse $e_1$, and four conditions, during the door closing operation, that the pulse $e_2$ rises at the "low" state of the pulse $e_1$, the pulse $e_1$ rises at the "high" state of the pulse $e_2$, the pulse $e_2$ falls at the "high" state of the pulse $e_1$ and the pulse $e_1$ falls at the "low" state of the pulse $e_2$. In this embodiment, other pulses due to noises may be eliminated so as to correctly determine the distance of displacement of the door.

As described hereinabove, according to the embodiment of the present invention, the weight of the door, the distance of movement of the door and the braking point are determined in the learn control, and the corresponding start phase angle, deceleration control phase angle and predetermined low velocity control phase angle are selected based on the determined values to effect the subsequent control for the door actuation. Accordingly, the adjustment in the installation of the door is not necessary and the door can be readily and precisely installed without experience and special skill. In addition, the present apparatus does not require a full-open switch, a full-close switch and a braking point switch for sensing the position of the door, and hence it does not require mounting of those switches to the door and wiring of the switches.

What is claimed is:

1. An automatic door actuator which is energized by an external power supply in response to turning-on of a power switch and which comprises a door, motor means coupled to said door to open and close said door, semiconductor controlled rectifying means for selectively connecting said motor means to the external power supply at a controlled phase angle to control a rotating velocity of said motor means, and control means operable, when activated, to supply a trigger signal at a controlled phase angle to said semiconductor controlled rectifying means to activate said semiconductor controlled rectifying means; wherein said actuator further comprises:

arithmetic means for calculating a weight of said door, distance of movement of said door and braking points of said door through learn control of door actuation which is effected once every time said power switch is turned on and irrespective of the on-off condition of said start switch;

first memory means for storing results of calculation by said arithmetic means;

second memory means for previously storing various phase angles for starting operation, for deceleration braking operation, and for predetermined low velocity control, corresponding to various weights of said door; and said control means being responsive to said first memory means to read out from said second memory means the phase angles for starting operation, for deceleration braking operation and for predetermined low velocity control corresponding to the actual weight of said door determined in said learn control to thereby supply the trigger signal to said semiconductor controlled rectifying means in accordance with the read-out phase angles corresponding to the actual door weight and the distance of movement of said door and the braking points of said door determined in said learn control.

2. An automatic door actuator according to claim 1, wherein said arithmetic means carries out the calculation in accordance with pulse signals produced from encoder means which is coupled to a rotary element of said motor means to generate said pulse signals in proportion to a rotational speed of said rotary element.

3. An automatic door actuator according to claim 1 or 2, wherein said control means responds to the turning-on of said power switch to supply said trigger signal to said semiconductor controlled rectifying means to carry out said learn control, said arithmetic means carries out the calculation for each learn control, and said first memory means updates its contents for each learn control.

4. An automatic door actuator according to claim 3, wherein said control means responds to the turning-on of said start switch to supply said trigger signal to said semiconductor controlled rectifying means to control the movement of said door such that said door is moved from its full-closed position to its full-opened position and, after a predetermined time period at the full-opened position, moved again to the full-closed position under the condition that said start switch is in its off-state.

5. An automatic door actuator according to claim 4, wherein said motor means is a reversible motor and said semiconductor controlled rectifying means includes a pair of altenatively triggered triode thyristors, one for forwardly driving said motor and the other for backwardly driving said motor.

6. An automatic door actuator according to claim 4, wherein said control means carries out additional learn control to detect the door weight to update the actual value thereof at the beginning of the door opening operation from its full-closed position in response to the turning-on of said start switch.

* * * * *